US010661515B2

(12) United States Patent
Hof et al.

(10) Patent No.: US 10,661,515 B2
(45) Date of Patent: May 26, 2020

(54) CASTING MOLD FOR THE MANUFACTURE OF OPHTHALMIC LENSES

(71) Applicant: Novartis AG, Basel (CH)

(72) Inventors: Jens Hof, Grosswallstadt (DE); Burkhard Dietrich, Monheim (DE); Roger Biel, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 373 days.

(21) Appl. No.: 14/946,249

(22) Filed: Nov. 19, 2015

(65) Prior Publication Data
US 2016/0144579 A1    May 26, 2016

Related U.S. Application Data

(60) Provisional application No. 62/084,159, filed on Nov. 25, 2014.

(51) Int. Cl.
*B29D 11/00* (2006.01)
*G02C 7/02* (2006.01)
*G02C 7/04* (2006.01)

(52) U.S. Cl.
CPC .... *B29D 11/0048* (2013.01); *B29D 11/00038* (2013.01); *B29D 11/00057* (2013.01);
(Continued)

(58) Field of Classification Search
CPC .......... B29D 11/0048; B29D 11/00038; B29D 11/00057; B29D 11/00182;
(Continued)

(56) References Cited

U.S. PATENT DOCUMENTS 4,268,133 A    5/1981 Reid
4,565,348 A *  1/1986 Larsen ............. B29D 11/00057
                                                     249/122

(Continued)

FOREIGN PATENT DOCUMENTS

EP    2031432 A2    3/2009
JP    H08194193 A2  7/1996
JP    2002113725 A2 4/2002

OTHER PUBLICATIONS

PCT International Search Report dated May 2, 2016, International Application No. PCT/EP2015/077034, International Filing Date Nov. 19, 2015.

(Continued)

*Primary Examiner* — Matthew J Daniels
*Assistant Examiner* — Yunju Kim
(74) *Attorney, Agent, or Firm* — Sheng-Hsin Hu

(57) ABSTRACT

A casting mold (1) for the manufacture of ophthalmic lenses, in particular hard and soft contact lenses comprises a male mold half (2) having a generally convexly shaped male mold surface (20) and a female mold half having a generally concavely shaped female mold surface (30). Each of the male and female mold surfaces comprises a lens-forming surface (21, 31) which is encircled by a non lens-forming annular edge surface (22, 32). The lens-forming surface (21, 31) comprises a central optical zone (210, 310) and a non-optical peripheral zone (211, 311) surrounding the central optical zone. At least one of the male and female mold halves (2, 3) is provided with at least one permanent marking (10; 11; 12; 110, 111) which is arranged on a surface in the peripheral zone (211, 311) of the lens-forming surface (21, 31) and/or on the non lens-forming annular edge surface (22, 32).

8 Claims, 3 Drawing Sheets

(52) U.S. Cl.
CPC .. *B29D 11/00182* (2013.01); *B29D 11/00336* (2013.01); *B29K 2909/08* (2013.01); *G02C 7/021* (2013.01); *G02C 7/04* (2013.01)

(58) Field of Classification Search
CPC .............. B29D 11/00336; B29D 11/00; B29K 2909/08; G02C 7/04; B29C 1/14
USPC ............ 425/412; 351/160; 249/122; 264/2.5
See application file for complete search history.

(56) References Cited

U.S. PATENT DOCUMENTS

| | | |
|---|---|---|
| 5,744,357 A | 4/1998 | Martin |
| 2001/0013921 A1 | 8/2001 | Walker |
| 2002/0195732 A1* | 12/2002 | Clark ............... B29D 11/00125 264/2.5 |
| 2004/0233822 A1 | 11/2004 | Kuwa |
| 2009/0059166 A1* | 3/2009 | Suzuki .................. B23K 26/18 351/159.73 |
| 2009/0102078 A1 | 4/2009 | Goodenough |
| 2017/0305086 A1* | 10/2017 | Kast ..................... G02B 3/0031 |

OTHER PUBLICATIONS

PCT International Written Opinion dated May 2, 2016, International Application No. PCT/EP2015/077034, International Filing Date Nov. 19, 2015.

* cited by examiner

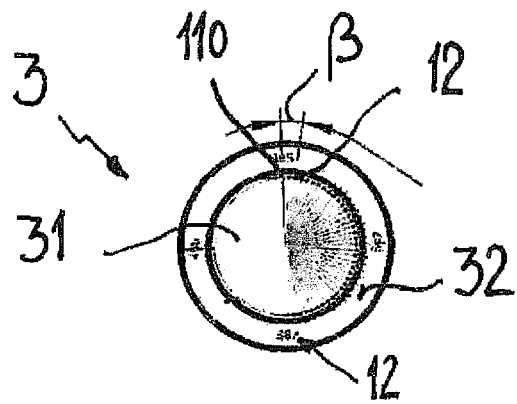
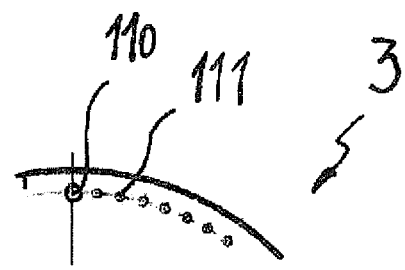
Fig. 8a
Fig. 8b
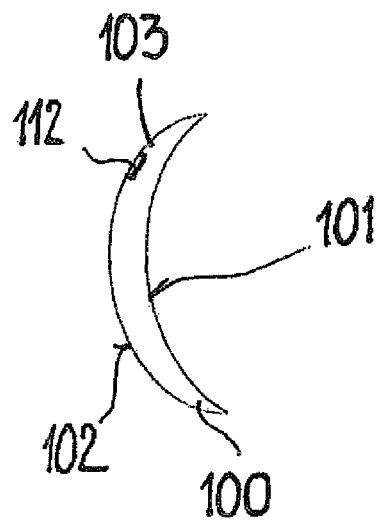
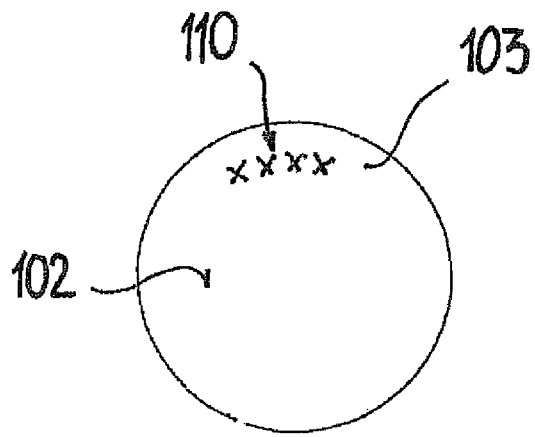
Fig. 9a
Fig. 9b

CASTING MOLD FOR THE MANUFACTURE OF OPHTHALMIC LENSES

This application claims the benefit under 35 U.S.C. § 119 (e) of U.S. provisional Application No. 62/084,159 filed Nov. 25, 2014, herein incorporated by reference in its entirety.

FIELD OF THE INVENTION

The present invention relates to a casting mold for the manufacture of ophthalmic lenses, in particular hard or soft contact lenses.

BACKGROUND OF THE INVENTION

Mass production of ophthalmic lenses, in particular hard or soft contact lenses, is usually performed in a fully automated manufacturing process. In an embodiment of such fully automated mass production the contact lenses are manufactured with reusable casting molds comprising male and female mold halves. The female mold halves are filled with a lens-forming material and the casting molds are subsequently closed with the corresponding male mold halves. Suitable lens-forming materials include but are not limited to polymers or pre-polymers based on polyvinyl alcohols (PVA) or silicone hydrogels (SiHy) as well as materials based on polyethylene glycols (PEG). The lens-forming material within the casting molds is then polymerized and/or cross-linked by irradiation with ultraviolet radiation. After polymerization and/or cross-linking the molds are opened and the formed contact lenses are removed from the male or female mold halves and transported to subsequent processing stations.

The male and female mold halves of reusable casting molds are provided with lens-forming surfaces which are typically made from highly finished glass, for example quartz glass. Lens-forming surfaces which are made of glass or quartz glass are durable regarding exposure to UV-light and organic solvents. They are reliably cleanable, resistant to abrasion, and therefore suitable for multiple use in the mass production of ophthalmic lenses.

In order to meet the needs of the users, large numbers of contact lenses with different parameters must be produced, in particular as regards contact lenses for single use only. Such parameters include but are not limited to the refraction power of a contact lens, the base curve, the toric shape of the lens, etc. Thus, for the manufacture of all types of contact lenses a large number of different casting molds is required and must be held on stock. Considerable care must be taken in the logistics and handling of the casting molds in order to avoid a mix-up of casting molds as they are prepared for use in the fully automated manufacturing process. Typically, in preparation of production a plurality of such casting molds are mounted to a mold carrier which is then placed on the manufacturing line. Since casting molds having different parameters may be mounted to the same mold carrier at different locations on the mold carrier, it is essential that the individual casting molds having the desired parameters are mounted to the mold carrier at the intended positions on the mold carrier before the mold carrier is placed on the manufacturing line so as to avoid production of contact lenses having parameters different from those originally intended.

Therefore, one object of the invention is to facilitate the logistics and handling of a large number of casting molds with different parameters and to avoid mix-up of casting molds as they are prepared for use in the fully automated manufacturing process. In addition, it is desirable to allow for an automated verification of the casting molds even after they have been placed on the manufacturing line.

SUMMARY OF THE INVENTION

One aspect of the present invention, therefore, relates to a casting mold for the manufacture of ophthalmic lenses, in particular hard or soft contact lenses. The casting mold of the present invention comprises a male mold half having a generally convexly shaped male mold surface and a female mold half having a generally concavely shaped female mold surface. Each of the male and female mold surfaces comprises a lens-forming surface which is encircled by a non lens-forming annular edge surface. The lens-forming surface comprises a central optical zone and a non-optical peripheral zone surrounding the central optical zone. At least one of the male and female mold halves is provided with at least one permanent marking which is arranged on a surface in the peripheral zone of the lens-forming surface and/or on the non lens-forming annular edge surface.

In some embodiments of the casting mold according to the invention the permanent marking comprises information about optical parameters of the ophthalmic lens to be produced.

In some further embodiments of the casting mold according to the invention the permanent marking at least partially comprises the information in an encoded manner.

In particular, a circumferential position of the permanent marking on the surface in the peripheral zone of the lens forming surface and/or on the edge surface of the non lens-forming annular edge surface may comprise information on specific lens parameters of the ophthalmic lens to be produced.

In still some further embodiments of the casting mold according to the invention the permanent marking is arranged at least on the peripheral zone of the lens-forming surface and comprises an embossed relief.

In particular, the permanent marking may have the shape of a bas-relief, with raised portions of the bas-relief protruding from the surface of the peripheral zone of the lens-forming surface and having a height which is in a range of 0.002 mm to 0.060 mm, more preferably in the range of 0.010 mm to 0.035 mm.

In some embodiments of the casting mold according to the invention at least the lens forming surface is shaped by precision molding (e.g. precision glass molding).

In some further embodiments of the casting mold according to the invention the permanent marking is arranged on the non-optical peripheral zone of the lens forming surface of the female mold half.

In still some further embodiments of the casting mold according to the invention at least the lens-forming surface is made from highly finished glass. In particular, the highly finished glass is quartz glass.

In yet some further embodiments of the casting mold according to the invention the permanent marking is arranged at least on the non lens-forming annular edge surface, and wherein the permanent marking in the non lens-forming annular edge surface is made by laser engraving.

A further aspect of the present invention relates to a casting mold assembly comprising a mold carrier and a plurality of casting molds arranged in the mold carrier in side-by-side configuration. At least one of the casting molds arranged in the mold carrier is a casting mold according to the invention, as it is described above.

Still a further aspect of the present invention relates to a method of manufacturing an ophthalmic lens, in particular a hard or a soft contact lens. The method comprises providing at least one casting mold comprising a male mold half and a female mold half, each of the male and female mold halves comprising a lens forming surface defining a cavity therebetween when the male and female mold halves are arranged in a predetermined spatial relationship. The method further comprises introducing a lens forming material into the cavity and curing the lens forming material in the cavity to form an ophthalmic lens. The step of providing at least one casting mold comprises providing at least one casting mold according to the invention, as it is described above.

In some embodiments of the method according to the invention, a plurality of ophthalmic lenses are produced at the same time, and the step of providing at least one casting mold comprises providing a casting mold assembly according to the invention, as it is described above.

Yet a further aspect of the invention relates to an ophthalmic lens having a rear surface adapted for being in contact with the eye of a user and a front surface. At least one of the rear surface and the front surface is provided with a permanent marking on a non-optical peripheral zone thereof. The ophthalmic lens according to the invention is manufactured using a casting mold according to the invention, as described above, or using a casting mold assembly according to the invention, as it is described above.

In some embodiments of the ophthalmic lens according to the invention the permanent marking comprises information about optical parameters of the ophthalmic lens.

Using a casting mold according to the invention an unambiguous identification of the casting mold is ensured with the aid of the permanent marking. The term "permanent" is intended to denote a marking which is not removed from the casting mold after the mold has been used to produce an ophthalmic lens. Rather, the marking remains on the casting mold and is present on the casting mold as this casting mold is reused in the subsequent manufacture of additional ophthalmic lenses. While not being limited thereto, examples for such permanent markings include markings produced by embossing, engraving, etching, laser marking, or any other suitable techniques. Thus, in addition to allowing for a verification of the casting molds at the time of their preparation for use in the fully automated manufacturing process (for example verification of the casting molds arranged on the mold carrier before the mold carrier is placed onto the manufacturing line), the permanent marking also allows for verification of the casting molds after they have been placed onto the manufacturing line. For example, such verification of the casting molds can be performed using an optical inspection system present in the manufacturing line. With this in-line inspection and comparison with respective position data stored in a programmable logic control unit of the manufacturing line it can be ascertained that the correct casting mold is indeed arranged at the correct position on the respective mold carrier in the manufacturing line. This may be of advantage in particular in fully automated manufacturing processes, in which not only a plurality of contact lenses are manufactured simultaneously with the aid of a plurality of casting molds which are arranged on a mold carrier in side-by-side configuration, but also in which a plurality of mold carriers are used in the manufacturing line. In this respect, it should be noted again that the contact lenses produced with the molds arranged on the same carrier need not have the same optical parameters but may all have different optical parameters. By using casting molds with respective markings, it can be easily verified if the correct casting mold is present at the respective position on a respective mold carrier and if the data stored in the programmable logic control unit of the manufacturing line are in accordance therewith.

The permanent marking may provide a plurality of information to the observer. For example, such information may contain information about the manufacturing site, the type of casting mold, etc. More importantly, though, in an embodiment of the casting mold according to the invention the permanent marking may comprise information about optical parameters of an ophthalmic lens which is manufactured with the respective casting mold. Such information may include, but is not limited to, the type of the lens geometry (lens design), diopters, toric shape of the lens, etc.

Again by way of example, the permanent marking may be present in "clear text", that is the permanent marking may be constituted of alphanumeric characters. In order to be able to include even more information the permanent marking may at least partially comprise the information in an encoded manner. Such code may be embodied as or comprise a bar-code, a two-dimensional QR-code, a dot-code, a symbol-code, or any combination of different kinds of codes. For example, the meaning of the different codes may be stored and accessed in the programmable logic control unit of the manufacturing line.

Also, the circumferential position of the permanent marking on the surface in the peripheral zone of the lens-forming surface and/or on the non lens-forming annular edge surface may comprise information on specific lens parameters of the ophthalmic lens produced with the mold. For example, an angular deviation from a reference position may be used to encode the diopters of an ophthalmic lens produced with the respective casting mold. The angular deviation from the reference position may have positive and negative values, thus representing positive and negative diopters of the corrective optical power.

The permanent marking may be arranged at least on the surface in the peripheral zone of the lens-forming surface and may comprise an embossed relief. When an ophthalmic lens is manufactured with such casting mold the embossed relief arranged on the surface in the peripheral zone of the lens forming surface the embossed relief is transferred to a non-optical peripheral zone on the respective front or base surface of the ophthalmic lens (depending on whether the relief is provided on the surface in the peripheral zone of the male mold half or of the female mold half), so that the relief does not obstruct the vision of the user of the ophthalmic lens. The embossed relief leads to a corresponding sunk relief on the non-optical peripheral surface of the ophthalmic lens. The sunk relief does not impair the wearing comfort for the user of the ophthalmic lens. The transferred marking at the periphery of the ophthalmic lens allows for a further control and verification of the correct position of the casting mold within the automated manufacturing line. This "hard-coding" of the ophthalmic lens has the advantage of an elimination even of the possibility of mistakes in the assignment of a produced lens and its corresponding casting mold, as it may possibly occur, if the produced ophthalmic lens is "soft-coded", for example by ink-jet printing.

In particular, the embossed relief has the shape of a bas-relief with raised portions of the bas-relief protruding from the surface of the peripheral zone of the lens-forming surface a height which is in the range of 0.002 mm to 0.060 mm, more preferably in the range of 0.010 mm to 0.035 mm. A marking of such height is very small and may be easily transferred to the non-optical peripheral zone even of thin ophthalmic lenses. In case the permanent marking or the relief, respectively, is provided in the non-lens forming annular edge surface the height may be in the range of 0.002 mm to 0.050 mm.

In another embodiment of the invention at least the lens forming surface of the casting mold is shaped by precision molding (in particular precision glass molding). Precision molding is a process which allows the production of surfaces of optical quality without the need of grinding and polishing. Precision molding has the advantage that it allows for a cost-efficient production of surfaces even if these surfaces have complex geometries such as, for example, aspheric geometries.

Generally, the permanent marking may be applied to the male mold surface of the male mold half or to the female mold surface of the female mold half, or to both. In one particular embodiment, the permanent marking is arranged on the non-optical peripheral zone of the lens-forming surface of the female mold half, so that the marking is transferred to the peripheral non-optical zone of the ophthalmic lens.

As already mentioned, at least the lens-forming surfaces of the male and female mold halves are made from highly finished glass. Glass is a material which may be shaped and finished in the desired manner. It is enduring and may be refinished relatively easily, for example by the afore-mentioned precision glass molding process. In particular, the highly finished glass may be quartz glass.

As mentioned already, by embodying the permanent marking on the casting mold as a "hard-coded" marking having the shape of an embossed relief and arranging the embossed relief in the non-optical peripheral zone of the lens-forming surface of the male or female mold half, it may be ensured that an ophthalmic lens manufactured with this casting mold only has a permanent marking in a non-optical zone of the ophthalmic lens, and the shape of the sunk relief does not have any portions protruding beyond the front or rear surface of the ophthalmic lens. However, bearing in mind that the non lens-forming annular edge surfaces of the male and female mold halves which encircle the lens-forming surfaces, do not participate at all in the shaping of the lens because they may be masked during polymerization or cross-linking of the lens-forming material, permanent marking may also be arranged on such non lens-forming annular edge surface of the male or female mold halves and may be made by laser engraving. Thus, if deemed necessary, additional information may be added to the casting mold to at least on one of these non lens-forming surfaces at any time the casting mold has been removed from the manufacturing line.

As regards the casting mold assembly according to the invention, the method according to the invention, and the ophthalmic lens produced with such casting mold or casting mold assembly, the advantages are already discussed in connection with the embodiment of the casting mold, so that they are not reiterated here.

BRIEF DESCRIPTION OF THE DRAWINGS

Additional features and advantages of the invention will become apparent from the following description of exemplary embodiments of the invention, reference being made to the schematic drawings, in which:

FIG. 3b shows a plan view of the female mold surface of the female mold half of FIG. 3a;

FIG. 6b shows a plan view of the male mold surface of the male mold half of FIG. 6a;

FIG. 7b shows a plan view of the male mold surface of the male mold half of FIG. 7a;

FIG. 8a shows a schematic plan view of a further embodiment of a female mold half of a casting mold according to the invention, comprising a permanent marking on the lens-forming surface in a non-optical peripheral portion thereof for the illustration of an angular coding, as well as an additional permanent marking on the non lens-forming annular edge surface thereof;

FIG. 8b shows an enlarged view of a portion of FIG. 8a comprising the angular coded permanent marking;

FIG. 9a shows a schematic side view of an ophthalmic lens according to the invention, comprising a permanent marking in a non-optical peripheral zone of the front surface thereof; and FIG. 9b shows a plan view of the front surface of the ophthalmic lens shown in FIG. 9a.

DETAILED DESCRIPTION OF EMBODIMENTS

Figure 1:
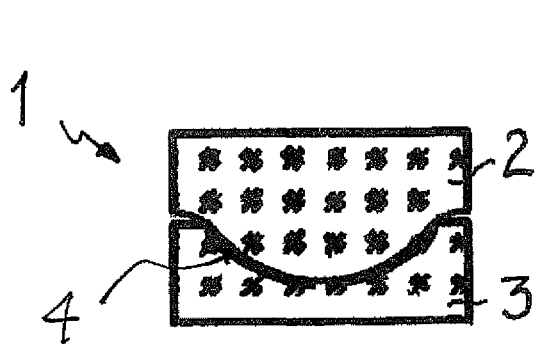
FIG. 1 shows a section through an embodiment of a casting mold according to the invention, comprising a male mold half and a female mold half.

FIG. 1 shows an embodiment of a casting mold 1 according to the invention for use in an automated manufacturing line for ophthalmic lenses, in particular hard and soft contact lenses. The casting mold 1 comprises a male mold half 2 and a female mold half 3. When assembled in a predetermined spatial relationship the male and female mold halves 2, 3 define a mold cavity 4 therebetween, in which the contact lens is formed from a lens-forming material. Male mold half 2 and female mold half 3 may be made of highly finished glass, for example of quartz glass or any other suitable glass.

Figure 2:
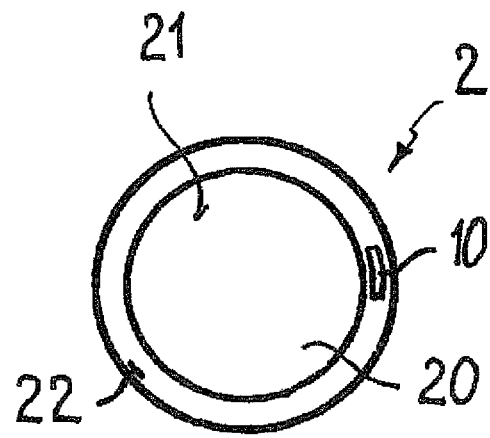
FIG. 2 shows a plan view of a generally convexly shaped male mold surface of the male mold half shown in FIG. 1 having a permanent marking on a non lens-forming annular edge surface thereof.

FIG. 2 shows a plan view of the male mold surface of the male mold half 2 shown in FIG. 1. The male mold half 2 has a generally convexly shaped male mold surface 20 which comprises a lens-forming surface 21 which is encircled by a non lens-forming annular edge surface 22. As shown in FIG. 2, a permanent marking 10 is arranged on the annular edge surface 22 which does not participate in the shaping of the lens during production of the lens. The permanent marking 10 may be made by laser engraving.

Figure 3A:
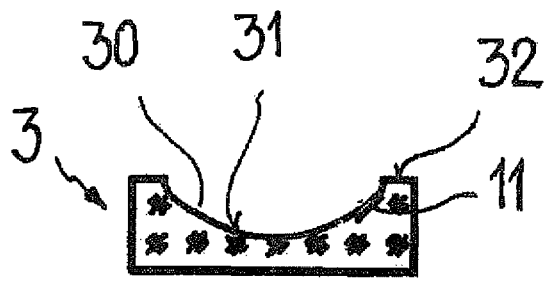
FIG. 3a shows a section through the female mold half shown in FIG. 1, comprising a generally concavely shaped female mold surface having a permanent marking on a lens-forming surface in a non-optical peripheral zone thereof.
Figure 3B:
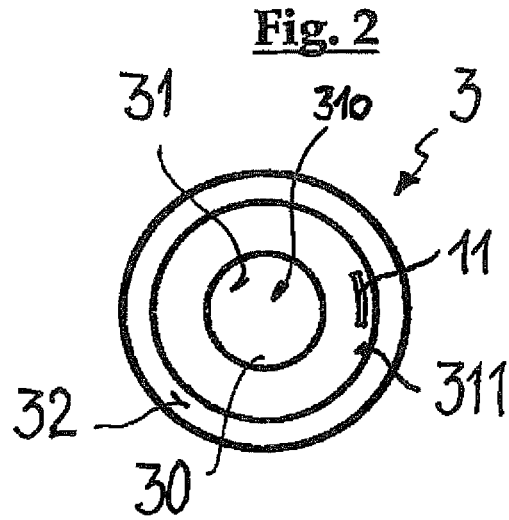

FIGS. 3a and 3b show a section and a plan view of the female mold half 3 of FIG. 1. The female mold half 3 comprises a generally concavely shaped female mold surface 30 comprising a lens-forming surface 31 and a non lens-forming annular edge surface 32 which encircles the lens-forming surface 31. The lens-forming surface 31 comprises a central optical zone 310 and a non-optical peripheral zone 311. The annular edge surface 32 does not participate in the shaping of the lens during production of the lens. A permanent marking 11 is arranged on the lens-forming surface 31 in the non-optical peripheral zone 311 thereof.

Figure 3C:
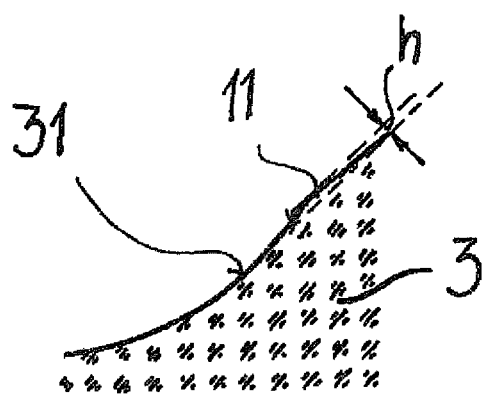
FIG. 3c shows an enlarged portion of the section of the female mold half of FIG. 3a, comprising the permanent marking.

As can be seen in FIG. 3c, the permanent marking 11 on the lens-forming surface 31 in the non-optical peripheral zone 311 (see FIG. 3b) thereof has the shape of an embossed relief, a bas-relief, in which regions of highest elevation above the lens forming surface 31 extend from the lens forming-surface 31 a height h in the range of 0.002 mm to 0.060 mm, more preferably in the range of 0.010 mm to 0.035 mm (in case the permanent marking or relief is provided in the annular edge surface 32 the height may be in the range of 0.002 mm to 0.050 mm). When a lens is produced using a female mold half 3 having such permanent marking 11 thereon, the permanent marking 11 is transferred to a non-optical peripheral zone of the front surface of the lens. The transferred marking corresponds with the permanent marking 11 on the lens-forming surface 31 and has the shape of a recessed relief. Thus, on the produced lens there are no elevated regions which might protrude beyond the lens surface and which might impair the comfort of a user of the lens.

The permanent marking 11 in the non-optical peripheral zone on the lens forming surface 31 may comprises clear text, that is to say it may comprise alphanumeric characters, or may be provided in coded form. Regardless of whether comprising clear text or being provided in coded form the permanent marking 11 may contain information about optical parameters of the lens which is formed using a respective female mold half 3. Such information includes, but is not limited to, information about the type of lens geometry, diopters, toric shape of the lens, etc.

Figure 4:
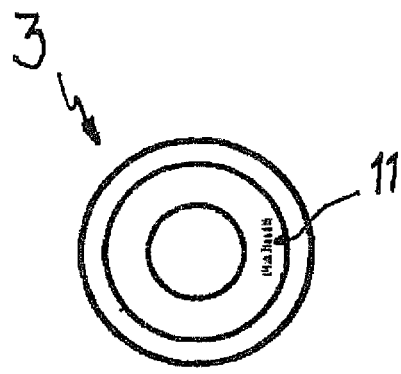
FIGS. 4, 5 show plan views of further embodiments of female mold halves of a casting mold according to the invention, each comprising a permanent marking on the lens-forming surface in the non-optical peripheral zone thereof.
Figure 5:
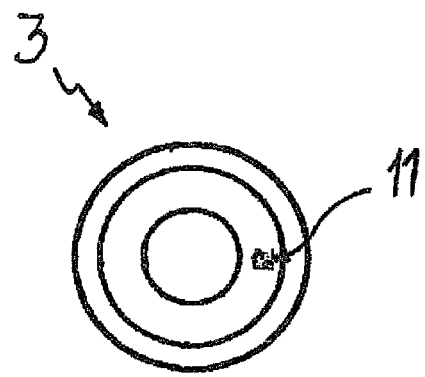

In the embodiment of a female mold half 3 of a casting mold according to the invention shown in FIG. 4 the permanent marking 11 comprises a bar code. In another embodiment of a female mold half 3 of a casting mold according to the invention shown in FIG. 5 the permanent marking 11 comprises a two-dimensional QR (Quick Response) code. Further code types include one-dimensional or two-dimensional dot codes, matrix codes, symbol-codes, etc. or any combination of different kinds of codes. The information corresponding to the different code patterns may be stored and accessed in the programmable logic control unit of the manufacturing line.

Figure 6A:
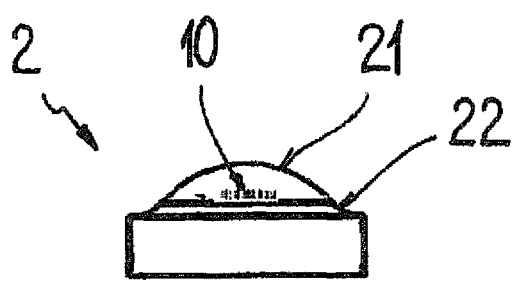
FIG. 6a shows a side view of a further embodiment of the male mold half of a casting mold according to the invention, comprising a permanent marking on the lens-forming surface in the non-optical peripheral portion thereof.
Figure 6B:
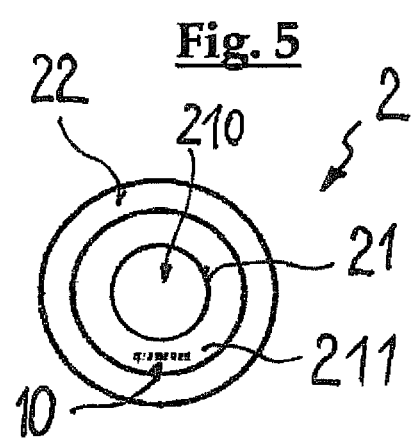

FIGS. 6a and 6b show in a side view (FIG. 6a) and in a plan view (FIG. 6b) a male mold half 2 having the generally convexly shaped male mold surface comprising the lens forming surface 21 and the non-lens forming annular edge surface 22. The lens-forming surface 21 comprises a central optical zone 210 and a non-optical peripheral zone 211 (see FIG. 6b) and in this peripheral zone 211 bears the permanent marking 10. In the depicted embodiment the permanent marking 10 comprises a bar code. It should be noted, however, that the permanent marking 10 may comprise any other suitable kind of code, such as the afore-mentioned two-dimensional QR code, a dot-code, a symbol-code, etc., or any combination of different kinds of codes. The permanent marking 10 may also comprise clear text (alphanumeric characters) or may be a combination of clear text and coded information. As in the case of the female mold half 3 shown in FIGS. 3a-3c the permanent marking 10 has the shape of an embossed relief, in particular a bas-relief protruding beyond the lens forming surface 21 a height in the range of 0.002 mm to 0.060 mm, more preferably in the range of 0.010 mm to 0.035 mm (in case the permanent marking is provided in the annular edge surface 22 the height may be in the range of 0.002 mm to 0.050 mm). When a lens is produced with such male mold half 2 the permanent marking 10 is transferred to the rear surface of the lens in a peripheral non-optical zone of the lens.

Figure 7A:
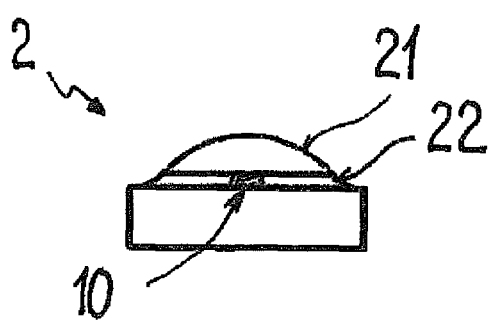
FIG. 7a shows a side view of a further embodiment of the male mold half of a casting mold according to the invention, comprising a permanent marking on a surface in the non lens-forming annular edge surface thereof.
Figure 7B:
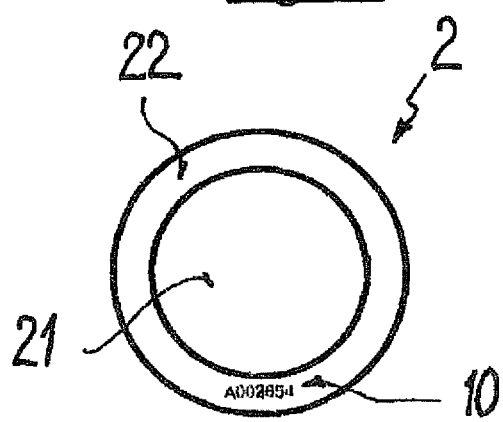

In a further embodiment of a male mold half 2 shown schematically in FIGS. 7a and 7b the permanent marking 10 is provided on the annular edge surface 22 which encircles (encloses) the lens forming surface 21, but does not contribute to the shaping of the lens during the lens forming process. The permanent marking 10 may be in coded form or, as shown in FIG. 7b, may comprise clear text in the form of alphanumeric characters. Because the annular edge surface 22 does not contribute to the shaping of the lens the permanent marking may either be of a raised shape or it may have a recessed shape. In the case of alphanumeric characters the permanent marking 10 may be made by laser engraving.

The embodiments schematically shown in FIG. 8a (side view) and FIG. 8b (plan view) of a female mold half 3 of the casting mold according to the invention with the lens-forming surface 31 shall serve for the illustration of another form of the encoding of information by a permanent marking 11. In addition to the permanent marking 11 arranged in the non-optical peripheral zone 311 of the lens-forming surface 31, the female mold half 3 may be provided, for example, with further engraved markings 12 on the annular edge surface 32. On the surface of the non-optical peripheral zone 311 of the lens-forming surface 31 a permanent marking having the shape of protruding dots may be provided. For example, a larger dot 110 at the twelve o'clock position may serve as a reference position. A smaller dot 111 may be positioned an angular distance β from the larger dot 110 representing the reference position. The larger dot 110 and the smaller dot 111 are both located at the same perimeter in the non-optical peripheral zone 311 of the lens-forming surface 31. The angular distance β of the smaller dot 111 from the larger dot 110 may serve, for example, as an indicator for the diopters of a lens produced with the specific female mold half. The depiction of a larger number of smaller dots 111 in FIGS. 8a and 8b is for illustration purposes only and is intended to show different possible locations of the smaller dots 111 along the respective perimeter in the non-optical peripheral region 3111 of the lens-forming surface 31. Each smaller dot 111 has a different angular distance from the larger dot 110, thus representing a different positive diopter. While in FIGS. 8a and 8b only locations of the smaller dots 111 are shown in clockwise distances (to the right) from the reference position, the smaller dots 111 may also be located at counterclockwise distances (to the left) from the reference position, thus indicating negative diopters of a lens which is produced using such female mold half 3.

It should be noted that the representation of the reference position by a larger dot 110 and of the diopter indicator by a smaller dot 111 is by way of example only. Various other forms of encodings by permanent markings on specific circumferential positions are conceivable. It should be further noted that a similar circumferential encoding may be carried out also with the aid of the male mold half. By providing both mold halves with permanent markings in clear text and/or in encoded form even more information may be expressed. The information corresponding to the respective encodings may be stored and accessed, for example, in the programmable logic control unit of the manufacturing line. When mold halves are inspected in-line in the automated manufacturing line, the encoded information may be communicated to an operator through a visual output device in clear text.

It should further be noted that the provision of at least one permanent marking on the male mold half and/or on the female mold half may not only be used for information purposes, but in case of toric lenses it may also be utilized to produce markings on the produced lenses for a proper alignment of the toric lens.

FIGS. 9a and 9b schematically show an ophthalmic lens 100 which has been produced using a casting mold 1 according to the invention. The ophthalmic lens 100 may be a hard or a soft contact lens, for example. The contact lens 100 has a rear surface 101 which is adapted for being in contact with the eye of a user, and a front surface 102. In accordance with the invention the contact lens 100 may be provided with a marking 112 on the front surface 102 and/or on the rear surface 101. In the embodiment shown, the marking 112 is located on a non-optical peripheral region 103 of the front surface 101 of the lens 100. The "hard-coded" marking 112 has the shape of a recessed relief, corresponding to the embossed relief on the respective female mold half. The marking 112 on the lens 100 may be inspected in-line and allows a better control of the automated manufacturing process. Due to the absence of any protruding portions of the marking 100, the comfort for the user wearing the lens is not negatively affected.

The invention claimed is:

1. Casting mold for the manufacture of contact lenses, comprising a male mold half having a generally convexly shaped male mold surface and a female mold half having a generally concavely shaped female mold surface, each of the male and female mold surfaces comprising a lens-forming surface which is encircled by a non-lens-forming annular edge surface, the lens-forming surface comprising a central optical zone and a non-optical peripheral zone surrounding the central optical zone, at least one of the male and female mold halves being provided with at least one permanent marking which is arranged only on the non-lens-forming annular edge surface, wherein the at least one of the male and female mold halves is made from highly finished glass by precision glass molding process.

2. Casting mold according to claim 1, wherein the permanent marking comprises information about optical parameters of the contact lens to be produced.

3. Casting mold according to claim 1, wherein the permanent marking at least partially comprises the information in an encoded manner.

4. Casting mold according to claim 3, wherein a circumferential position of the permanent marking on the edge surface of the non-lens-forming annular edge surface comprises information on specific lens parameters of the contact lens to be produced.

5. Casting mold according to claim 1, wherein at least the lens forming surface is shaped by precision molding.

6. Casting mold according to claim 1, wherein the highly finished glass is quartz glass.

7. Casting mold according to claim 1, wherein the permanent marking in the non-lens-forming annular edge surface is made by laser engraving.

8. Casting mold assembly comprising a mold carrier and a plurality of casting molds arranged in the mold carrier in side-by-side configuration, wherein at least one of the casting molds arranged in the mold carrier is a casting mold according to claim 1.

* * * * *